United States Patent [19]

Frisbee et al.

[11] Patent Number: 5,203,214
[45] Date of Patent: Apr. 20, 1993

[54] ENGINE THROTTLE LINKAGE WITH MOTION-REVERSING FEATURE

[75] Inventors: Claude M. Frisbee, Schofield; Allen O. Erickson, Rothschild, both of Wis.

[73] Assignee: Case Corporation, Racine, Wis.

[21] Appl. No.: 864,234

[22] Filed: Apr. 6, 1992

[51] Int. Cl.$^5$ .................... G05G 1/14; G05G 11/00
[52] U.S. Cl. .................... 74/482; 74/513; 74/522
[58] Field of Search ............... 74/513, 522, 481, 482

[56] References Cited

U.S. PATENT DOCUMENTS

| | | | |
|---|---|---|---|
| 2,821,091 | 1/1958 | Benner | 74/513 X |
| 3,002,397 | 10/1961 | Du Shane et al. | 74/482 |
| 3,040,596 | 6/1962 | Du Shane et al. | 74/482 |
| 3,508,454 | 4/1970 | Fanslow et al. | 74/482 |
| 4,014,218 | 3/1977 | Brandt | 74/513 X |
| 4,059,025 | 11/1977 | Waack et al. | 74/482 |

Primary Examiner—Allan D. Herrmann
Attorney, Agent, or Firm—Jansson & Shupe, Ltd.

[57] ABSTRACT

The invention is primarily for use with earth-moving machinery, e.g., crawler tractors and the like. Machines are used in ways such that their operators like to be able have the engine "idle" at lower speed and manually accelerate it or at higher speed and manually decelerate it. The invention is an improvement in an engine throttle linkage of the type having a throttle rod and a pivot-mounted shaft for moving the rod in either of two directions for engine acceleration and deceleration, respectively. A pedal is depressed for pivoting the shaft and, consequently, moving the rod. The improvement is a motion-reversing mechanism with a lever-like member connected to the shaft and having first and second attachment points. An operator's pedal is coupled to one of the two attachment points by a linking stem. Pedal depression pivots the shaft in one direction or the other. Depressing the pedal accelerates or decelerates the engine, depending upon which attachment point is used. The inventive linkage also accommodates a hand-operated throttle lever and has provisions for setting and maintaining engine high or low idle speeds notwithstanding pedal movement.

16 Claims, 4 Drawing Sheets

FIG. 3
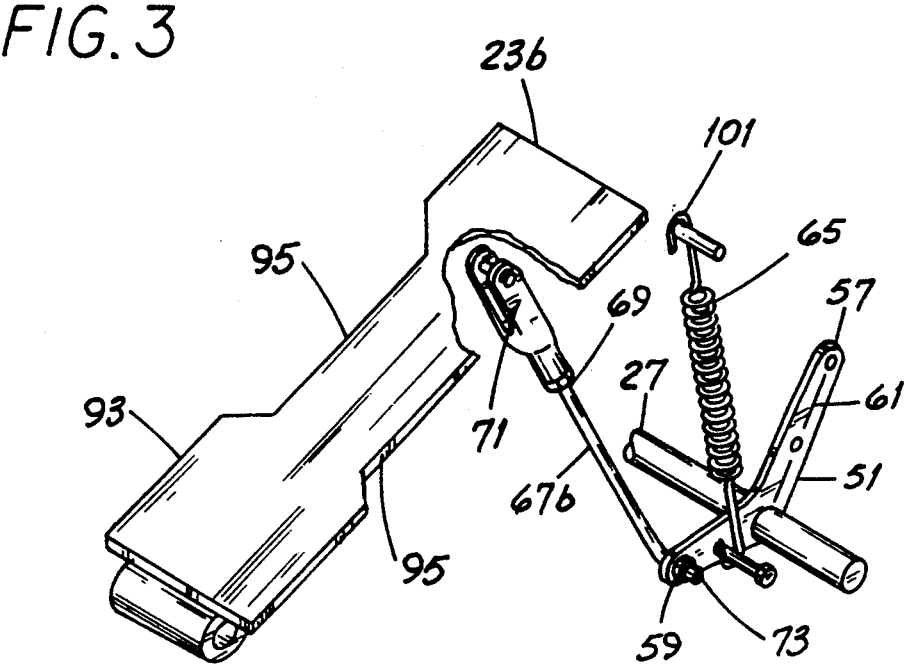
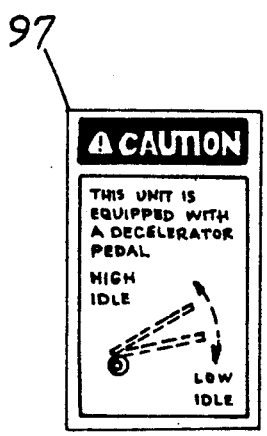
FIG. 4

ENGINE THROTTLE LINKAGE WITH MOTION-REVERSING FEATURE

FIELD OF THE INVENTION

This invention relates generally to engine speed controlling mechanisms and, more particularly, to such mechanisms as are used with off-highway vehicles.

BACKGROUND OF THE INVENTION

The engine and travel speeds of vehicles controlled by human operators, e.g., passenger autos, trucks and the like, is often controlled (at least as to engine speed) by controlling the position of a foot-operated accelerator. Accelerator-based speed control works very well in those situations where the road is smooth and, consequently, the driver has no trouble maintaining a steady foot position. Such speed control is also preferred where the operator has relatively few manual tasks to manage and/or such tasks are required to be performed rather infrequently.

On the other hand, there are situations where foot-operated speed control (as a continuing mode of operation) is distinctly undesirable. An example is a crawler tractor which usually operates on rough, operator-jostling terrain. Under such conditions, it is well-nigh impossible for the operator to maintain a steady engine speed by foot control alone.

And operating a crawler tractor may impose other requirements. When used as an earthmoving machine (rather than as, say, merely a "drawbar" vehicle to pull a load), the operator must continually manipulate levers and/or pedals to turn the vehicle and operate its blade or bucket to move earth or to load it into a truck. Notwithstanding the manual and mental dexterity required to operate such a machine in this way, some operators do prefer to control engine speed by a conventional accelerator-like pedal. Others do not.

Rather, they prefer to run the engine at a much higher speed (so-called "high idle") by using a manually set throttle lever and depress a pedal to decrease engine speed. An advantage of such operation is that because of the elevated engine speed, the horsepower available from it is substantially greater than the horsepower available from a slowly-idling engine. Simply stated, the vehicle is able to perform more work faster but without the annoyance (as some see it) of having to continually maintain a pedal in a depressed position.

The improved engine throttle linkage provides either type of pedal arrangement in a way believed to be unique.

OBJECTS OF THE INVENTION

It is an object of the invention to provide an improved engine throttle linkage overcoming some of the problems and shortcomings of the prior art.

Another object of the invention is to provide an improved engine throttle linkage whereby alternative modes of engine speed control can be selected.

Another object of the invention is to provide an improved engine throttle linkage which can be configured to accelerate engine speed or, in the alternative, to decelerate engine speed with pedal depression, whichever is preferred.

Yet another object of the invention is to provide an improved engine throttle linkage whereby the selected mode of engine speed control can be visually determined at a glance.

Still another object of the invention is to provide an improved engine throttle linkage which accommodates a hand-set throttle lever for setting an engine idle speed. How these and other objects are accomplished will become apparent from the description and the drawing.

SUMMARY OF THE INVENTION

The invention is primarily for use with off-highway vehicles such as earth-moving machines, e.g., crawler tractors and the like, which have a pedal for controlling engine speed. The pedal moves between an elevated and a depressed position much as with an automobile. But the effect of such pedal movement on engine speed is, in certain configurations, quite the opposite. Arrangements using a pedal depressed for engine acceleration or, in the alternative, depressed for engine deceleration are per se known. However, the invention provides this result in a unique way.

Briefly described, the invention uses a shaft which rotates and which has a throttle plate extending radially from it. The engine throttle rod attaches between the plate and an engine-mounted fuel pump, carburetor or other engine speed controlling apparatus. When the shaft is rotated through a partial revolution of, say, 75° or so, the rod is moved to accelerate or decelerate the engine, depending upon the direction of shaft rotation.

The shaft also has a generally "V" shaped lever-like member connected to it, the "arms" of such member extending from the shaft in generally opposite directions. When the vehicle operator's pedal is connected to one arm and depressed, the engine accelerates as in an automobile. If such pedal is connected to the other arm, the engine (then operating at "high idle" by means described below) decelerates when the pedal is depressed. In either instance, a spring biases the pedal to an elevated or repose position, much as with an automobile accelerator pedal.

More specifically, the invention is an improvement in an engine throttle linkage of the type having a throttle rod and a shaft pivot-mounted at either end. In general, the throttle rod is coupled to the shaft and, more particularly, to a throttle plate extending radially from the shaft. The resulting structure somewhat resembles a bell crank.

The shaft is rotatable through an arc for moving the rod generally linearly in a first or a second direction, e.g., away from or toward the engine fuel pump. In one specific arrangement, such rod motion respectively accelerates or decelerates the engine. When the operator's pedal is depressed, it pivots the shaft in one direction or another for reasons described in more detail below.

The improved linkage has a motion-reversing mechanism, so named because for a given direction of pedal travel, e.g., depressed toward the vehicle floor, the direction of throttle rod movement (as well as other parts) is reversed.

The linkage has a somewhat "V" shaped lever-like member connected to the shaft and having its "arms" extending radially from the shaft in separate and, preferably, generally opposite directions. The member has first and second pedal stem attachment points spaced from the shaft along separate radii. Preferably, the attachment points are on separate arms and are spaced generally equidistant from the shaft centerline.

An elongate, rod-like linking stem has one end coupled to the underside of the operator's pedal and extends between the pedal and the member. Pedal depression pivots the shaft in a first or second rotation direction, depending upon whether the other end of the stem is coupled to the first point or the second point, respectively. Whether pedal depression causes engine acceleration or deceleration is, therefore, a function of such stem-member coupling.

In one specific linkage arrangement, the stem is coupled to the first point and pedal depression causes engine acceleration. And, of course, when the stem is coupled to the second point, pedal depression causes engine deceleration.

In the improved linkage, the throttle plate, a paddle-shaped member, extends radially from the shaft. Such plate has first and second throttle rod connection points, each on a separate radius but both generally equidistant from the shaft centerline. With the throttle rod coupled to the first connection point and the stem coupled to the first attachment point, pedal depression causes engine acceleration. On the other hand, with the throttle rod coupled to the second connection point and the stem coupled to the second attachment point, pedal depression causes engine deceleration.

The improved linkage has great utility in providing operators of construction vehicles the flexibility they often need to change the vehicle engine speed up or down using pedal control. However, for additional operator convenience, the improved linkage also has features accommodating a hand-operated throttle lever. Such lever and the cable plate positioned by it have a range of movement bounded by high idle and low idle positions.

It will be recalled that throttle rod movement is that event which changes engine speed—and every engine speed corresponds to a particular throttle rod position. Briefly summarized, aspects of the throttle-lever-positioned cable plate limit travel of the throttle rod but do not affect rod movement between such limits. Rather, such rod movement is a function of foot pedal operation.

More specifically, the linkage includes a pivoting cable plate having a curved slot through it. Such slot is bounded by first and second slot ends. One or the other end of the slot "sets" the engine "idle" speed, either high or low, by limiting the distance the throttle rod is permitted to travel.

A flexible cable extends between the throttle lever and the cable plate and the throttle lever is used to set the plate position. If the linkage is arranged with the pedal stem coupled to the first attachment point and the throttle rod coupled to the first connection point, depressing the pedal accelerates the engine. Since the hand lever may be used to set the plate position, lever movement from the low idle position to a position near the low idle position moves the plate and therefore the position of the slot first end. This sets the limit of throttle rod travel in the lowered engine speed direction and, consequently, sets the engine low idle speed.

If the linkage is arranged with the pedal stem coupled to the second attachment point and the throttle rod coupled to the second connection point, depressing the pedal decelerates the engine. Lever movement from the high idle position to a position near high idle sets the engine high idle speed by setting the position of the slot second end.

In the first instance (when pedal depression causes engine acceleration), throttle lever movement from the low idle position toward the high idle position causes some amount of foot-free pedal depression in the "engine accelerate" direction. In the second instance (when pedal depression causes engine deceleration) throttle lever movement from the high idle position toward the low idle position causes some amount of foot-free pedal depression in the "engine decelerate" direction. In either instance, lever movement causes some amount of foot-free pedal movement as the idle speed is being set.

The plate and shaft are mounted for relative pivoting movement one to the other and an "L" shaped end of the throttle rod extends through the slot and moves along it as the foot-actuated pedal is depressed or released. However, the cable plate remains stationary (as does the attached throttle lever) so that the engine "idle" setting (high or low) is not disturbed.

After appreciating the foregoing, readers (especially those having experience with construction vehicles) will recognize the desirability of providing an indication to the operator as to whether the vehicle engine can be expected to accelerate or decelerate when the pedal is depressed. A visual indication is preferred since there is often a good deal of noise around construction sites.

Accordingly, the improved linkage preferably has a second pedal which can be interchanged with the conventional pedal. Such pedals are preferably visually different from one another and such visual difference should be facilitated by means other than, for example, a pedal sticker. A sticker would likely become damaged, dirty or destroyed.

Each pedal has a perimeter defining a shape and since each pedal is made of a durable material such as steel, a good way to distinguish the pedals visually is to provide them in differing perimeter shapes. For example, the conventional pedal (used for engine accelerating when depressed) has a rectangularly-shaped perimeter. The second pedal is shaped somewhat like the capital letter "I" and has cutaway side portions. Differing pedal shapes are thereby easily noted. It is also preferred to provide a cautionary decal which can be affixed to the vehicle instrument panel cover. Such decal gives the operator another visual indication that the second pedal is mounted.

Depending upon the overall configuration and arrangement of the linkage, it may be necessary to also provide a substitute stem for use with the second pedal. One instance where such a stem would be needed is where the attachment points are at slightly differing distances from the underside of the pedals. Second pedals (and, if needed, substitute stems) are non-staple items specially configured for the improved linkage.

Further details of the invention are set forth in the following detailed description taken in conjunction with the drawing.

BRIEF DESCRIPTION OF THE DRAWING

FIG. 3 is a perspective view, with part broken away, of an aspect of the improved linkage including an alternate second pedal coupled for engine deceleration by pedal depression.

FIG. 4 is a representative cautionary label used with the second pedal of FIG. 3.

In FIGS. 2, 3, 5 and 6, linkage supporting structure has been omitted for clarity.

DETAILED DESCRIPTION OF PREFERRED EMBODIMENTS

Figure 1:
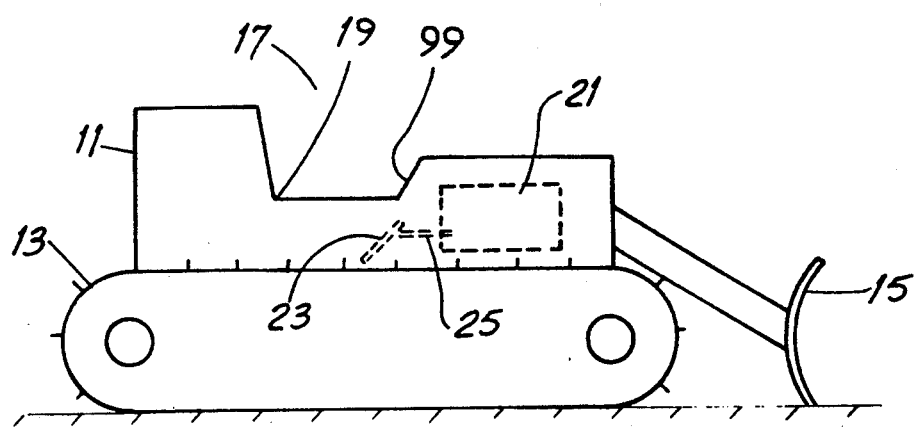
FIG. 1 is a representative side elevation view (with parts shown in dashed outline) of a crawler tractor, a type of vehicle for which the improved linkage is especially well suited for use.

The inventive engine throttle linkage 10 is configured primarily for use which a construction vehicle such as the crawler tractor 11 illustrated in FIG. 1. Such vehicle has crawler tracks 13, a dozer blade 15, an operator's compartment 17 with seat 19 and an engine 21, the speed of which can be changed by the operator's pedal 23. The pedal 23 is coupled to the engine fuel pump, carburetor control or the like by a linkage represented by the dashed lines 25.

Depending upon operator preference and upon the type of work being performed by the vehicle, the operator may wish to change (and, specifically, increase) engine speed by depressing the pedal 23. Engine speed control is then very similar to that of an automobile.

Figure 6:
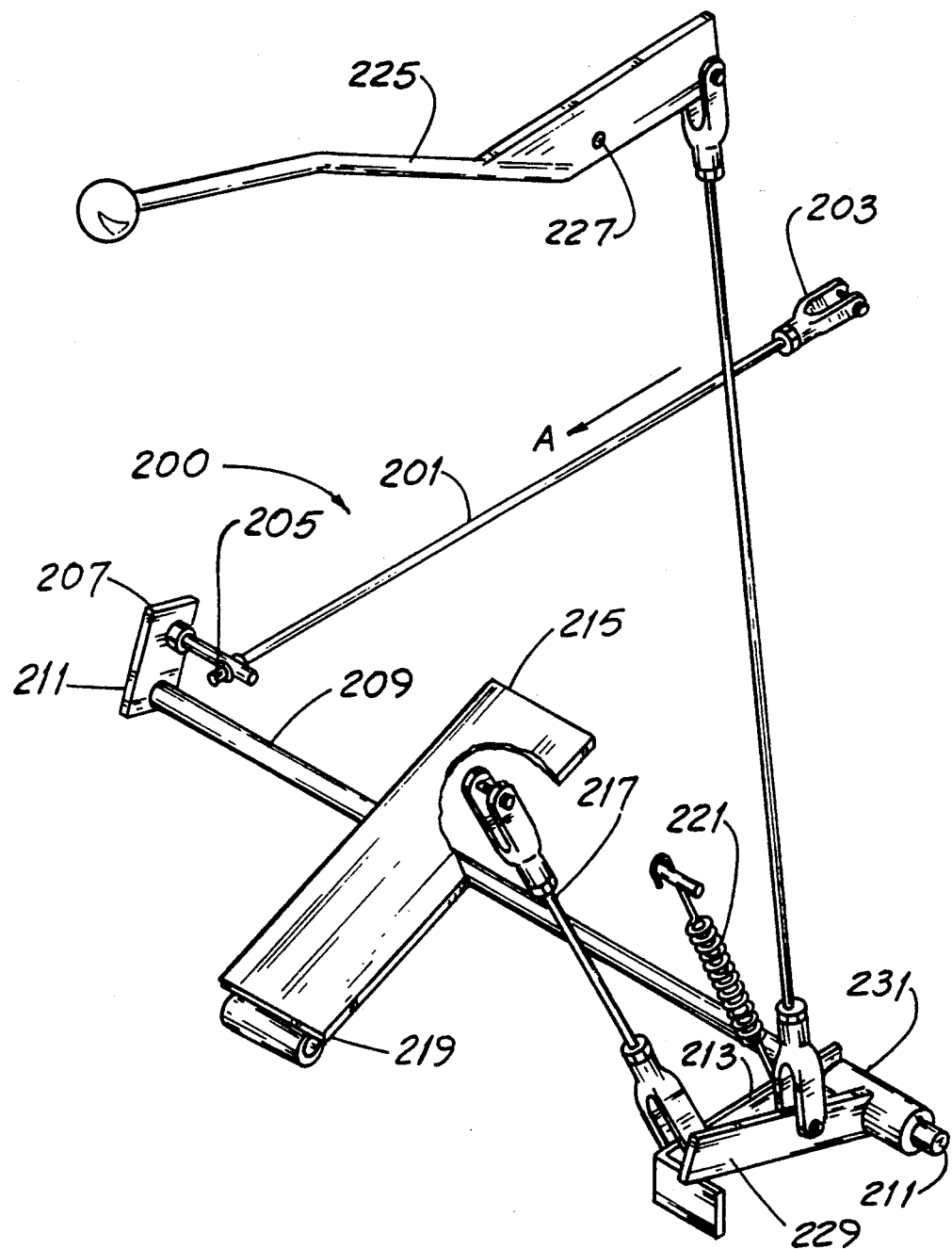
FIG. 6 is a representative perspective view of a prior art engine throttle linkage configured for engine acceleration by pedal depression.

However, there may be instances where the operator may wish to change (and, specifically, decrease) engine speed by depressing the pedal 23. Engine speed control is then generally opposite that of an automobile. The prior art linkage depicted in FIG. 6 is capable of the former mode of operation but not the latter.

DESCRIPTION OF PRIOR ART

Understanding of the improved engine throttle linkage 10 and the several features and advantages thereof will be aided by a brief explanation of aspects of that prior art linkage 200 which has a throttle rod 201, the distal end 203 of which connects to the fuel pump, injector, carburetor or other engine-speed-changing component. For a specific fuel pump, the rod 201 moves leftward and downward (as shown in FIG. 6) when the engine is accelerated from a low speed to a higher speed. The proximal end 205 of the rod 201 is pivotably connected to a upstanding plate 207 affixed to a cross shaft 209 which is mounted at either end 211 on bearings (not shown) for pivoting movement.

An "L" shaped pedal tongue 213 is attached to the shaft 209 and the underside of the pedal 215 is connected by a stem 217 to a hole in the tongue 213. The fulcrum or rear end 219 of the pedal 215 is affixed to the vehicle for up-and-down pedal pivoting movement. The biasing spring 221 is also hooked to a hole in the tongue 213 and anchored to a pin 223 to be placed in tension so as to bias the shaft 209 in a clockwise direction as such shaft 209 is viewed from the right end 211. Depressing the pedal 215 rotates the shaft 209 counter-clockwise and with it, the plate 207. The rod 201 thereby moves to accelerate the engine 21. Such movement is represented by the arrow "A".

A hand-set throttle lever 225 (arranged as a first class lever) is mounted for pivoting movement about a pin through the hole 227 A lever plate 229 is affixed to a pivoting bushing 231 mounted concentric to the shaft 209 and the length of the plate 229 and position of the bushing 231 are selected such that the under edge of the plate 229 bears on the top edge of the tongue 213.

It will be seen that as the lever 225 moves down (counter-clockwise in FIG. 6), the plate 229 bears on the tongue 213 and pushes the tongue 213 downward to rotate the shaft 209 counter-clock Wise, thus moving the rod 201 in the direction of arrow "A" to accelerate the engine 21. Since the lever 225 is configured to maintain its "last placed" position, the lever 225 is also used to set the engine low idle speed. That is, as the plate 229 is positioned farther down by pushing lever 225 down, the plate 229 limits the upward (clockwise) position to which the tongue 213 can love under the urging of the spring 221.

DESCRIPTION OF THE INVENTIVE LINKAGE

The improved linkage 10 has a shaft 27 mounted for rotation about the shaft long axis 29. The shaft 27 is supported at either end 31 by bearings (not shown). Reference in this portion of the specification to "counter-clockwise" and "clockwise" rotation are, unless indicated otherwise, with respect to a viewer looking along the axis 29 from the shaft right end 31 as shown in FIG. 2.

Figure 5:
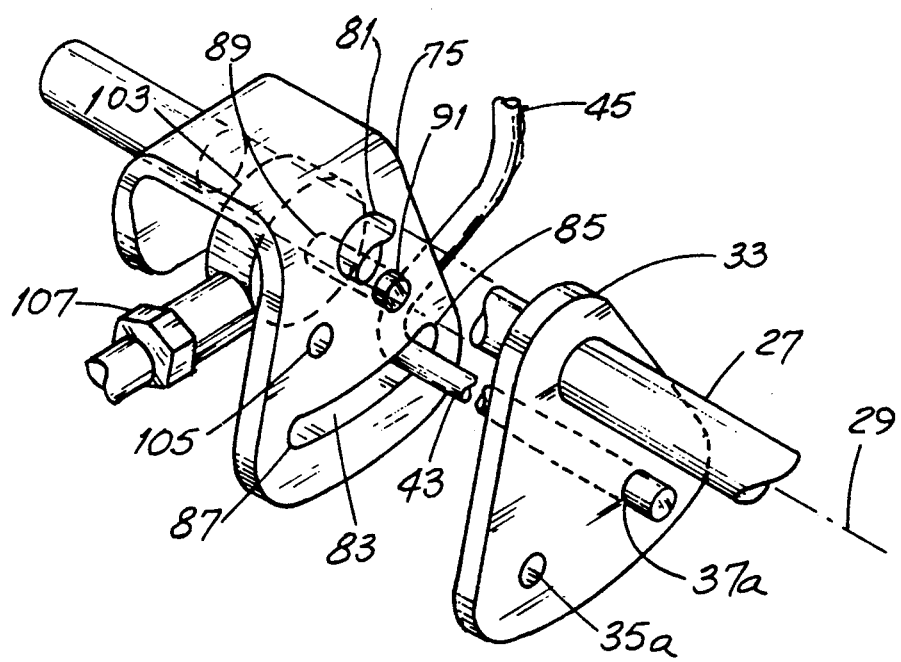
FIG. 5 is an enlarged perspective view of a portion of linkage shown in FIGS. 2 and 3 with parts broken away and other parts in dashed outline.
Figure 2:
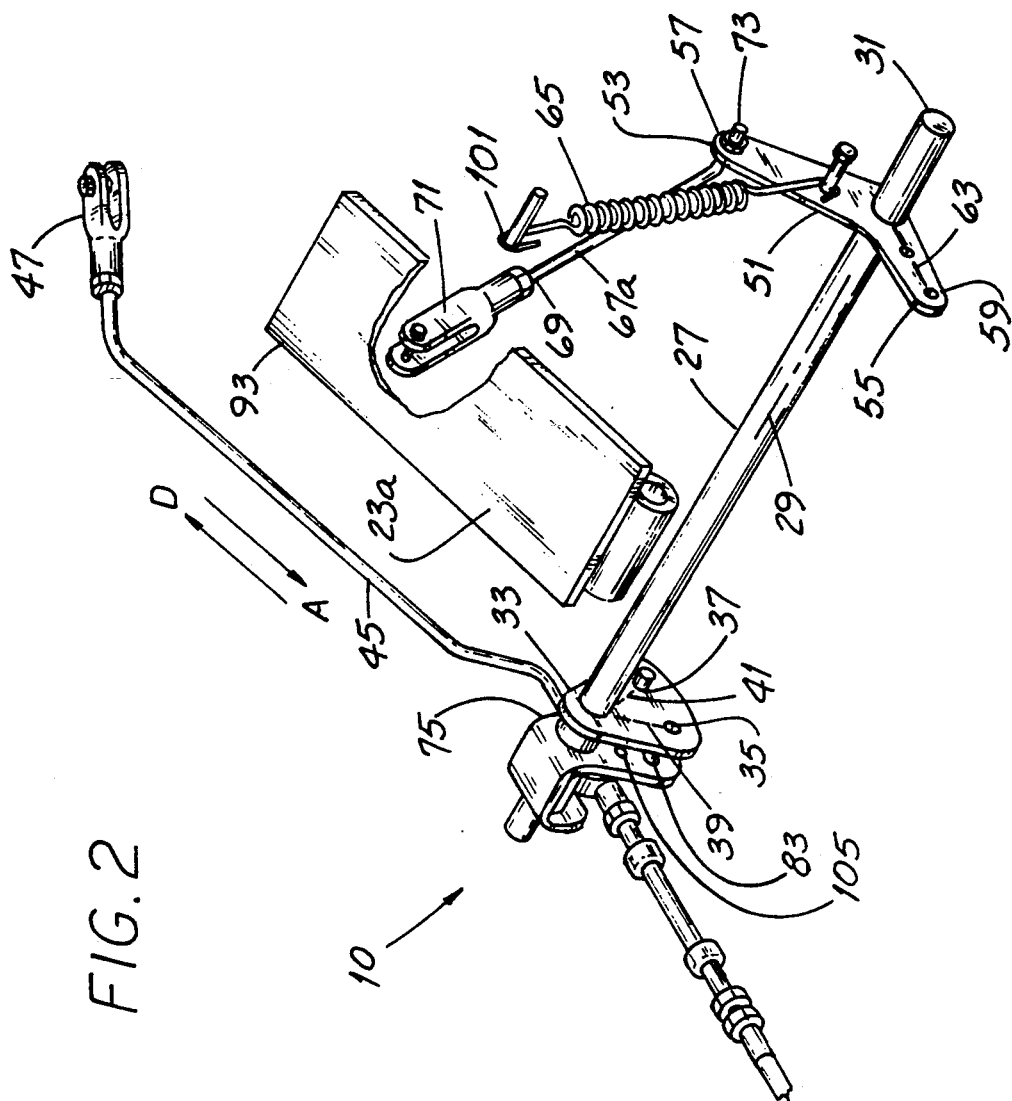
FIG. 2 is a perspective view of the improved engine throttle linkage, with part broken away and another part in dashed line, configured for engine acceleration by pedal depression.
Figure 2:
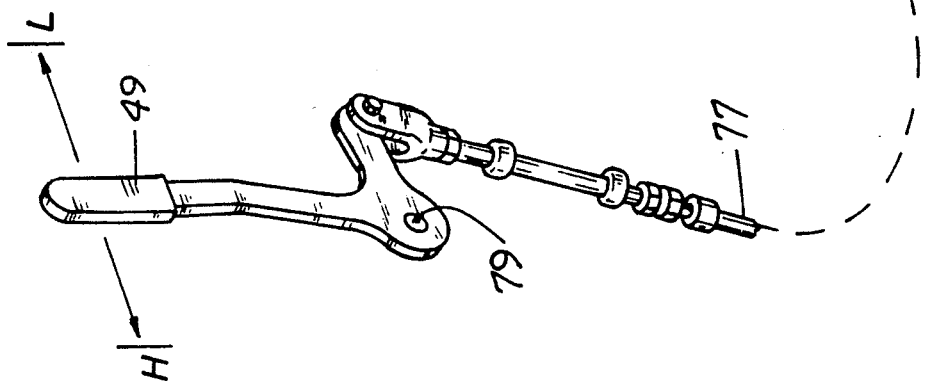

Referring to FIGS. 2, 3 and 5 a paddle-like engine control lever or throttle plate 33 extends radially outward from the shaft 27 and has a pair of holes 35, 37 generally equidistant from the axis 29 but on separate radii 39 and 41, respectively. As will be seen, the "L" shaped proximal end 43 of the engine throttle rod 45 is attached to the plate 33 by extending such end 43 through one of the two holes 35, 37 defining the first and second throttle rod connection points 35a and 37a, respectively. The distal end 47 of the engine throttle rod 45 attaches to an engine-mounted fuel pump or the like.

When the shaft 27 is rotated through a partial revolution of, say, 75° or so, the rod 45 moves generally linearly to accelerate the engine 21 or to decelerate it, depending upon the direction of shaft rotation. The rod 45 moves leftward and down in FIG. 2 in the "A" arrow direction or first direction for engine acceleration and oppositely in a second direction (in the direction of "D" arrow) for engine deceleration. As will be seen, shaft rotation is by depressing the pedal 23a or 23b or by moving the hand throttle lever 49.

In one aspect of the inventive linkage 10, shaft rotation is by a generally "V" shaped lever-like member 51 rigidly connected to the shaft 27 and having first and second "arms," 53 and 55, respectively, extending radially outward from the shaft 27. The arms 53 and 55 include first and second pedal stem attachment points 57 and 59, respectively. Such attachment points 57, 59 are generally equidistant from the long axis 29 and are located on separate radii 61 and 63, respectively. When the pedal 23a is coupled to the point 57 (on the first arm 53) and depressed, the shaft 27 rotates clockwise and the engine 21 accelerates as in an automobile. If pedal 23b is connected to the point 59 and depressed,the shaft 27 rotates counter-clockwise and the engine 21 (then operating at "high idle" by means described below) decelerates. In either instance, a tension spring 65 biases the pedal 23a, 23b to its elevated or repose position, much as with an automobile accelerator pedal.

In accordance with the foregoing, the improved linkage 10 may be said to have a motion-reversing mechanism, so named because for a given direction of pedal travel, the direction of throttle rod movement (as well as other parts) is reversed.

Coupling of a pedal 23a, 23b to an arm 53 or 55 is by an elongate, rod-like linking stem 67a or 67b, the proximal end 69 of which is threaded to a yoke 71 on the underside of the operator's pedal 23a or 23b. The distal end 73 extends to the member 51 for attachment to the first point 57 or the second point 59, respectively. Therefore, pedal depression pivots the shaft 27 in a first or second rotation direction (clockwise or counterclockwise, respectively, in the illustrated embodiment), depending upon where the stem distal end 73 is attached. Whether pedal depression causes engine acceleration or deceleration is, therefore, a function of such stem-member coupling.

From the foregoing, it will be appreciated that with the end 43 of the throttle rod 45 coupled to the first connection point 35a and the pedal 23a coupled to the first attachment point 57, pedal depression rotates the shaft 27 clockwise and causes engine acceleration. On the other hand, with the throttle rod 45 coupled to the second connection point 37a and the pedal 23b coupled to the second attachment point 59, pedal depression causes engine deceleration.

The improved linkage 10 has great utility in providing operators of construction vehicles the flexibility they often need to change the vehicle engine speed up or down using pedal control. However, for additional operator convenience, the improved linkage also has features accommodating a hand-operated throttle lever 49.

It will be recalled that movement of the throttle rod 45 is that event which changes engine speed—and every engine speed corresponds to a particular throttle rod position. This principle should be borne in mind while analyzing the following portion of the specification.

The improved linkage 10 also includes a cable-controlled plate (which will be referred to as the cable plate 75) to which the hand throttle lever 49 is hooked by a flexible cable 77. The lever 49 is mounted for pivoting movement about a pin through the hole 79 and is frictionally retained in its "last-placed" position in a known manner. The lever 49 and the plate 75 positioned by it have a range of movement bounded by high idle and low idle positions designated as "H" and "L," respectively, in FIG. 2.

It is recognized that to many persons, "high" (as in "high speed") and "idle" have mutually exclusive connotations. As used in the industry and as used herein, "high idle" means that elevated speed (in revolutions per minute) at which the engine 21 runs when it is not loaded by the vehicle doing work, i.e., when the engine is "idle." Similarly, "low idle" is a lower speed at which the unloaded engine 21 runs.

Aspects of the throttle-lever-positioned cable plate 75 limit travel of the throttle rod 45 but do not cause rod movement between such limits. Rather, such rod movement is a function of foot pedal operation. (However, the positions of the limits of rod travel can change as described below.)

The mounting apertures 81 of the pivoting cable plate 75 is concentric with the shaft long axis 29. But the cable plate 75 is mounted for movement independent of that of the shaft 27. Plate movement and plate position, respectively, are under the urging of the lever 49 and as set by lever position.

Referring particularly to FIG. 5, the plate 75 has an arc-like curved slot 83 through it and such slot 83 is bounded by first and second slot ends 85 and 87, respectively. In general, one or the other end of the slot 83 "sets" the engine "idle" speed, either high or low, by limiting the distance the "L" shaped end 47 of the throttle rod 45 is permitted to travel. The reader's understanding will be aided if it is borne in mind that for a given position of the lever 49, when the throttle rod end 43 is at the second end 87 of the slot 83 (its left end in FIG. 5), engine speed is high. And the closer the throttle rod end 43 is to the first end 85 of the slot 83 (its right end in FIG. 5), the slower will be the speed of the engine 21.

For purposes of illustration, it will be assumed that the linkage 10 is arranged with the pedal 23a coupled to the first attachment point 57 and the throttle rod end 43 coupled to the first connection point 35a. When so arranged, depressing the pedal 23a accelerates the engine 21.

It will also be assumed that the lever 49 is in its lowest-engine-speed position (i.e., extreme clockwise location) and the cable end 89 is attached to the plate 75 at the first hole 91. Since the hand lever 49 is used to set the plate position, leftward lever movement from the low idle position to a position near the low idle position moves the plate 75 clockwise. Therefore, the "locus" or the position of the slot first end 85 moves somewhat to the left or clockwise as viewed in FIG. 5.

In view of the slightly "advanced" position of the first end 85, the "L" shaped end 43 of the throttle rod 45 (and thus the rod 45 per se) are prevented from moving all the way to the right to the lowest-engine-speed position. The low engine idle speed is thereby increased slightly. To put it another way, moving the lever 49 from its "L" position toward its "H" position sets the limit of throttle rod travel in the lowered engine speed direction and, consequently, sets the engine low idle speed.

And motion-reversing is easily obtained. If the linkage 10 is arranged with the pedal 23b coupled to the second attachment point 59 and the throttle rod end 43 coupled to the second connection point 37a, depressing the pedal 23b decelerates the engine 21. Rightward lever movement from the "H" high idle position to a position near high idle sets the engine high idle speed by setting the position of the slot second end 87. That is, the proximal end 43 of the throttle rod 45 is prevented from going further leftward as viewed in FIG. 5. Once the low idle point or high idle point (as the case may be) is set by manipulating the hand lever 49, the cable plate 75 remains stationary (as does the attached lever 49) so that the engine "idle" setting (high or low) is not disturbed.

Referring additionally to FIGS. 3 and 4, operators find it highly desirability to provide an indication as to whether the vehicle engine 21 can be expected to accelerate or decelerate when the pedal 23a or 23b is depressed. A visual indication is preferred since there is often a good deal of noise around construction sites. To that end, a second pedal 23b can be interchanged with the conventional pedal 23a. Such pedals 23a or 23b are preferably visually different from one another and such visual difference should be facilitated by means other than, for example, a sticker on the pedal 23a or 23b. A sticker would likely become damaged, dirty or destroyed.

Each pedal 23a, 23b has a perimeter 93 defining a shape and since each pedal 23a or 23b is made of a durable material such as steel, a good way to distinguish the pedals 23a, 23b visually is to provide them in differing perimeter shapes. For example, the conventional pedal 23a (used for engine accelerating when depressed) has a rectangularly-shaped perimeter 93. The second pedal 23b is shaped somewhat like the capital letter "I" and has cutaway or indented side portions 95. Differing pedal shapes are thereby easily noted. It is also preferred to provide a cautionary decal 97 which can be affixed to the vehicle instrument panel cover 99. Such decal 97 gives the operator another visual indication that the second pedal 23b is mounted.

Depending upon the overall configuration and arrangement of the linkage 10, it may be necessary to also provide a substitute stem 67b for use with the second pedal 23b. One instance where such a stem 67b would be needed is where the attachment points 57, 59 are at slightly differing distances from the underside of the pedals 23a, 23b. To change from the conventional pedal 23a to the second pedal 23b, the pedal 23a and stem 67a are removed, the pedal 23b is substituted and the pedal 23b and stem 67b are mounted. A substitute stem (like stem 67b) is used during re-mount only if required. The stem 67b used with the pedal 23b is attached to the second attachment point 59 (on the second arm 55) rather than to the point 57 on the arm 53. The spring end 101 is anchored to put the spring 65 in tension as before.

The proximal end 43 of the throttle rod 45 is moved from the first connection point 35a to the second connection point 37a and the cable end 89 is detached from the first hole 91 in the plate 75. Such end 89 is threaded leftward along the cable 77 until its "eye 103" aligns with the second hole 105, whereupon the lock nut 107 is tightened and the end 89 pinned to the second hole 105. Any cautionary decal 97 is then applied to the instrument panel cover 99.

From the foregoing, it should be appreciated that when the second pedal 23b is used, the lever 49 is set much more toward its "H" position, i.e., at or near high idle. In that arrangement, the proximal end 43 of the rod 45 will abut the second end 87 of the slot 83 when the pedal 23b is in the elevated or repose position and moves toward the slot first end 85 as the pedal 23b is depressed.

While the foregoing sets forth the description of the preferred embodiments, it is not intended to be limiting. After understanding the specification and the drawing, those of ordinary skill will appreciate other ways to configure the linkage 10 without departing from the spirit of the invention.

We claim:

1. In an engine throttle linkage having a throttle rod, a shaft pivot-mounted for rod movement in first and second directions for engine acceleration and deceleration, respectively, and a conventional pedal depressed for pivoting the shaft, the improvement wherein the linkage has a motion-reversing mechanism comprising:
   a lever-like member connected to the shaft and having first and second attachment points spaced from the shaft along separate radii;
   a pedal coupled to the member by a linking stem extending therebetween, pedal depression pivoting the shaft in a first or second rotation direction when the pedal is coupled to the first point or the second point, respectively,
   whereby pedal depression causes engine acceleration or deceleration.

2. The linkage of claim 1 wherein the pedal is coupled to the first point and pedal depression causes engine acceleration.

3. The linkage of claim 1 wherein the pedal is coupled to the second point and pedal depression causes engine deceleration.

4. The linkage of claim 2 wherein the pedal is depressed from an elevated position to a depressed position and the linkage includes a spring urging the pedal to the elevated position.

5. The linkage of claim 3 wherein the pedal is depressed from an elevated position to a depressed position and the linkage includes a spring urging the pedal to the elevated position.

6. The linkage of claim 1 wherein:
   the throttle rod extends between the engine and a throttle plate attached to the shaft;
   the throttle plate has first and second throttle rod connection points; and,
   pedal depression causes engine acceleration when the throttle rod is coupled to the first connection point and the pedal is coupled to the first attachment point.

7. The linkage of claim 1 wherein:
   the throttle rod extends between the engine and a throttle plate attached to the shaft;
   the throttle plate has first and second throttle rod connection points; and,
   pedal depression causes engine deceleration when the throttle rod is coupled to the second connection point and the pedal is coupled to the second attachment point.

8. The linkage of claim 1 further including a cable plate having a slot therein and wherein:
   the cable plate and shaft are mounted for relative pivoting movement one to the other; and,
   the throttle rod extends through the slot and moves therealong with foot-actuated pedal depression during which the cable plate remains stationary.

9. The linkage of claim 8 further including a cable extending between a throttle lever and the cable plate whereby lever movement causes foot-free pedal movement.

10. The linkage of claim 9 wherein the throttle moves through a range of movement bounded by high idle and low idle positions, the pedal is coupled to the first point and lever movement from the low idle position toward the high idle position causes foot-free pedal depression.

11. The linkage of claim 9 wherein the throttle moves through a range of movement bounded by high idle and low idle positions, the pedal is coupled to the second point and lever movement from the high idle position toward the low idle position causes foot-free pedal depression.

12. The linkage of claim 9 wherein:
   the slot has first and second slot ends;
   the first end bears against the throttle rod when the pedal is coupled to the first attachment point and the throttle rod is coupled to the first connection point;
   the throttle lever moves through a range of movement bounded by high idle and low idle positions; and,
   lever movement from the low idle position to a position near thereto moves the throttle rod and thereby sets the engine low idle speed.

13. The linkage of claim 9 wherein:
   the slot has first and second slot ends;

the second end bears against the throttle rod when the pedal is coupled to the second attachment point and the throttle rod is coupled to the second connection point;

the throttle lever moves through a range of movement bounded by high idle and low idle positions; and, lever movement from the high idle position to a position near thereto sets the engine high idle speed.

14. The linkage of claim 1 further including a second pedal for replacing the conventional pedal.

15. The linkage of claim 14 wherein the conventional pedal and the second pedal are visually different from one another.

16. The linkage of claim 15 wherein each pedal has a perimeter defining a shape and the pedals are visually distinguished by differing perimeter shapes.

* * * * *